US011486351B2

(12) United States Patent
Avaldi et al.

(10) Patent No.: US 11,486,351 B2
(45) Date of Patent: Nov. 1, 2022

(54) SEALING MEMBER FOR A SECTIONED WIND TURBINE BLADE

(71) Applicant: BLADE DYNAMICS LIMITED, Hampshire (GB)

(72) Inventors: Andrea Avaldi, Hampshire (GB); Chris Paul Swatton, Hampshire (GB); Harry George James Fish, Hampshire (GB); Manish Mukherjee, Hampshire (GB)

(73) Assignee: BLADE DYNAMICS LIMITED, Hampshire (GB)

( * ) Notice: Subject to any disclaimer, the term of this patent is extended or adjusted under 35 U.S.C. 154(b) by 0 days.

(21) Appl. No.: 17/289,550

(22) PCT Filed: Oct. 25, 2019

(86) PCT No.: PCT/EP2019/079171
§ 371 (c)(1),
(2) Date: Apr. 28, 2021

(87) PCT Pub. No.: WO2020/089069
PCT Pub. Date: May 7, 2020

(65) Prior Publication Data
US 2021/0396206 A1 Dec. 23, 2021

(30) Foreign Application Priority Data
Oct. 29, 2018 (GB) ...................... 1817618

(51) Int. Cl.
*F03D 1/06* (2006.01)
(52) U.S. Cl.
CPC ........ *F03D 1/0675* (2013.01); *F05B 2230/60* (2013.01); *F05B 2240/302* (2013.01); *F05B 2240/57* (2013.01); *F05B 2250/61* (2013.01)

(58) Field of Classification Search
None
See application file for complete search history.

(56) References Cited

U.S. PATENT DOCUMENTS

| 4,260,332 A | 4/1981 | Weingart et al. |
| 8,206,107 B2 | 6/2012 | Dawson et al. |
(Continued)

FOREIGN PATENT DOCUMENTS

| CA | 2714771 A1 | 3/2011 |
| EP | 1467066 A2 | 10/2004 |
(Continued)

OTHER PUBLICATIONS

Search Report dated Apr. 15, 2019 for application No. GB1817618.0.
(Continued)

*Primary Examiner* — Eldon T Brockman
(74) *Attorney, Agent, or Firm* — Nath, Goldberg & Meyer; Jerald L. Meyer; Tanya E. Harkins

(57) ABSTRACT

Disclosed is a method for sealing a joint between a first blade section and a second blade section of a wind turbine blade, a sealing member and a wind turbine blade comprising a sealing member. The sealing member having a first surface and a second surface. The sealing member having a width between a first edge and a second edge. The sealing member being configured for attachment to the first outer shell along the first edge, and for attachment to the second outer shell along the second edge. The sealing member comprising a corrugated section between the first edge and the second edge, the corrugated section comprising one or more valleys and/or ridges extending along a lengthwise direction of the sealing member.

19 Claims, 11 Drawing Sheets

(56) References Cited

U.S. PATENT DOCUMENTS

| | | | |
|---|---|---|---|
| 9,086,054 B2 * | 7/2015 | Loh | F03D 1/0683 |
| 9,617,973 B2 * | 4/2017 | Stege | F03D 1/0675 |
| 10,760,545 B2 * | 9/2020 | Yarbrough | F03D 1/0675 |
| 2011/0079596 A1 | 4/2011 | Krasznai et al. | |
| 2012/0169060 A1 * | 7/2012 | Loh | F03D 1/0641 |
| | | | 290/55 |
| 2013/0323070 A1 * | 12/2013 | Grabau | F03D 1/0675 |
| | | | 29/889.7 |
| 2014/0186189 A1 * | 7/2014 | Stege | F03D 1/0675 |
| | | | 264/261 |
| 2018/0223796 A1 * | 8/2018 | Yarbrough | F03D 1/0675 |
| 2018/0238300 A1 | 8/2018 | Shain et al. | |

FOREIGN PATENT DOCUMENTS

| | | |
|---|---|---|
| EP | 2418072 A1 | 2/2012 |
| EP | 2749765 A1 | 7/2014 |
| EP | 2881580 A1 | 6/2015 |
| WO | 2010026903 A1 | 3/2010 |
| WO | 2012113400 A2 | 8/2012 |

OTHER PUBLICATIONS

International Search Report dated Jan. 1, 2020 for application No. PCT/EP2019/079171.

* cited by examiner

SEALING MEMBER FOR A SECTIONED WIND TURBINE BLADE

This is a National Phase Application filed under 35 U.S.C. 371 as a national stage of PCT/EP2019/079171, filed Oct. 25, 2019, an application claiming the benefit of European Application No. 1817618.0, filed Oct. 29, 2018, the content of each of which is hereby incorporated by reference in its entirety.

The present disclosure relates to a sealing member, in particular for a wind turbine blade, more specifically the disclosure relates to a sealing member for sealing a joint between adjoining sections, such as adjoining sections of a wind turbine blade, such as a wind turbine blade comprising a first blade section and a second blade section, and optionally more blade sections.

BACKGROUND

As the demands for blades for wind turbines tends towards blades of increasing lengths, attention is increasing on concepts of manufacturing blades in sections, e.g. for being assembled at the installation site. Such wind turbine blade, comprising a plurality of sections, may be known as a split blade, or two-part blade, or segmented blade or similar.

However, several challenges are associated with such design, relating to the manufacturing and joining of the shell segments including how to join the shells of the succeeding sections without compromising aerodynamic performance and/or generation of undesirable increased noise.

Furthermore, it may be important to seal such joint between segments in order to prevent rain, dust, or other things from the outside environment from entering into the wind turbine blade, potentially causing damages to interior components of the wind turbine blade.

Furthermore, as a segmented wind turbine blade will often or always be assembled in the field, e.g. at the erection site. It is also of interest to provide solutions to facilitate easy and simple assembly of the wind turbine blade.

Similar challenges may be found in other industries, and the solutions provided below may thus be applicable also in assembly of sections of structures other than wind turbine blades or wind turbines.

SUMMARY

It is an object of the present disclosure to provide elements and methods for supporting the assembly and performance of a segmented structure, in particular to facilitate the assembly and performance of a segmented wind turbine blade.

Accordingly, a sealing member is disclosed, such as a sealing member for sealing a joint between sections of a structure, such as a joint between a first blade section and a second blade section of a wind turbine blade, wherein the second blade section is coupled to the first blade section. The sealing member has a first surface and a second surface. The sealing member has a width between a first edge and a second edge. The sealing member is configured for attachment to a first outer surface, such as a first outer shell of the first blade section, along the first edge, and for attachment to a second outer surface, such as a second outer shell of the second blade section, along the second edge. The sealing member comprises a corrugated section between the first edge and the second edge. The corrugated section comprises one or more valleys and/or ridges extending along a lengthwise direction of the sealing member.

Also disclosed is a wind turbine blade comprising a first blade section and a second blade section coupled to the first blade section. The first blade section extending along a longitudinal axis from a root to a first end, the first blade section comprising a root region and a first airfoil region. The first blade section comprising a first outer shell terminating at the first end. The second blade section extending along the longitudinal axis from a second end to a tip, the second blade section comprising a second airfoil region, the second blade section comprising a second outer shell terminating at the second end. The wind turbine blade comprises a sealing member, such as the sealing member as disclosed above, e.g. to seal a joint between the first blade section and the second blade section. The sealing member has a first surface and a second surface. The sealing member has a width between a first edge and a second edge. The sealing member is attached to the first outer shell along the first edge, and the sealing member is attached to the second outer shell along the second edge. The sealing member comprises a corrugated section between the first edge and the second edge. The corrugated section comprises one or more valleys and/or ridges extending along a lengthwise direction of the sealing member.

Also disclosed is a method for sealing a joint between sections of a structure, such as a joint between a first blade section and a second blade section of a wind turbine blade, wherein the second blade section is coupled to the first blade section, such as a wind turbine blade as disclosed above. The first blade section extending along a longitudinal axis from a root to a first end, the first blade section comprising a root region and a first airfoil region. The first blade section comprising a first outer shell terminating at the first end. The second blade section extending along the longitudinal axis from a second end to a tip, the second blade section comprising a second airfoil region. The second blade section comprising a second outer shell terminating at the second end.

After positioning the sections of the structure in their respective positions, e.g. after coupling and positioning the first blade section and the second blade section in their respective position to form the wind turbine blade, the method comprises: Providing a sealing member, such as the sealing member as disclosed above, having a first surface and a second surface, the sealing member having a width between a first edge and a second edge, the sealing member comprising a corrugated section between the first edge and the second edge, the corrugated section comprising one or more valleys and/or ridges extending along a lengthwise direction of the sealing member; and applying the sealing member to the joint between the first blade section and the second blade section. Applying the sealing member comprises: Attaching the sealing member to a first outer surface, such as the first outer shell, along the first edge; and attaching the sealing member to a second outer surface, such as the second outer shell along, the second edge.

Optionally, prior to applying the sealing member to the joint, the method comprises cleaning a first shell bond area of the first outer shell and/or cleaning a second shell bond area of the second outer shell. Cleaning the first shell bond area and/or the second shell bond area may comprise e.g. abrasing and/or cleaning using solvent. Alternatively or additionally, the cleaning may comprise wiping the first shell bond area and/or the second shell bond area dry, e.g. using a dry cloth.

Although the present disclosure is mainly describing utilizing the disclosed sealing member in relation to sealing of a joint between sections of a wind turbine blade, it will be realised that the disclosed sealing member and the method of sealing a joint using the sealing member may be used in sealing of joints of other structures, such as automotive parts, aircraft parts, watercraft parts, robotics, machinery etc.

It is an advantage that a flexible and non-bespoke sealing member is provided, and that a joint may be sealed, e.g. preventing ingress or egress of liquids and/or debris to/from a cavity, in a simple and easy procedure.

It is a further advantage of the present disclosure that the joint may be sealed from the outside, e.g. after the sections forming the joints have been attached and respectively positioned. Hence, the present disclosure provides an easier and more convenient method for sealing a joint between sections of a structure.

It is a further advantage of the present disclosure that an amount of flexibility is provided in the sealing member, such as to allow some degree of compression and/or expansion, such as to prevent or reduce the risk of failure.

Furthermore, it is an advantage of the present disclosure, that in the case of sealing a joint of a wind turbine blade, the disclosure provides a sealing member and a method for sealing a joint, which may maintain aerodynamic performance of the wind turbine blade, while avoiding or reducing transfer of significant loads between blade shell ends. In a preferred embodiment, the sealing member allows for not more than 10% load transfer, such as not more than 5% load transfer, between the first blade section and the second blade section. It is thus preferred that the major part, such as at least 90% or at least 95%, or all of the load transfer between the first blade section and the second blade section is via the one or more spar beams. Loads and moments are thus advantageously transferred from one blade section via the spar beam into the other blade section, rather than via the sealing member.

Furthermore, it is an advantage of the present disclosure, in particular in the case of sealing a joint of a wind turbine blade, that operational noise levels may be kept within acceptable limits.

Furthermore, it is an advantage of the present disclosure, that it may be provided to facilitate lightning protection of the structure, e.g. the wind turbine blade, and in particular of the joint.

The second surface of the sealing member may comprise bond areas configured to be bonded to exterior surfaces near the joint. The second surface of the sealing member may comprise a first bond area along the first edge. The first bond area may be configured to be bonded to the first outer shell. The second surface may comprise a second bond area along the second edge. The second bond area may be configured to be bonded to the second outer shell. For example, attaching the sealing member to the first outer shell along the first edge may comprise bonding together the first bond area and a first shell bond area of the first outer shell. Thus, the sealing member may be attached to the first outer shell of the wind turbine blade by the first bond area and a first shell bond area of the first outer shell being bonded together. Additionally or alternatively, attaching the sealing member to the second outer shell along the second edge may comprise bonding together the second bond area and a second shell bond area of the second outer shell. Thus, the sealing member may be attached to the second outer shell of the wind turbine blade by the second bond area and a second shell bond area of the second outer shell being bonded together. Bonding together the first bond area and the first shell bond area and/or bonding together the second bond area and the second shell bond area may be provided by gluing, welding etc. For example, the first bond area and the first shell bond area and/or the second bond area and the second shell bond area may be bonded together by glue, dual sided tape, adhesive etc.

The first edge and the second edge of the sealing member may be parallel, such as substantially parallel.

The sealing member has a corrugated section. The corrugated section may have a peak-to-peak height, e.g. between 10-30 mm, such as 15 mm.

The sealing member may have a thickness between the first surface and the second surface. The sealing member may have a generally uniform thickness between the first surface and the second surface. The sealing member may have a generally uniform thickness between the first surface and the second surface in the corrugated section. The thickness of the sealing member, such the thickness of the corrugated section of the sealing member, may be between 0.5-5.0 mm, such as 2 mm.

The sealing member may be an extruded member or a pultruded member. The sealing member may have a substantially constant cross-section along the lengthwise direction.

It is preferred that the material constituting the sealing member is different than the material constituting the first and second blade sections.

In a preferred embodiment, the sealing member has a lower stiffness than the first blade section and the second blade section. Similarly, it is preferred that the elastic modulus of the material forming the sealing member is lower than the elastic modulus of the material forming the first blade section and of the material forming the second blade section.

In a preferred embodiment, the sealing member is formed from a material having a modulus of elasticity (Young's modulus) of 1000 MPa or less, preferably 500 MPa or less. In some embodiments, the sealing member has an elastic modulus (Young's modulus) of between 1 and 1000 MPa, such as between 1 and 500 MPa. The skilled reader will understand that the elastic modulus, also known as Young's modulus, defines the relationship between stress (force per unit area) and strain (proportional deformation) in a material. Thus, the elastic modulus is a measure of the stiffness of a material. The elastic modulus can be determined by the cantilever beam test, as is well known in the art.

The sealing member may comprise a thermoplastic polyurethane, such as aliphatic thermoplastic polyurethane. In a preferred embodiment, the sealing member may be made of thermoplastic polyurethane, such as aliphatic thermoplastic polyurethane. The material of the sealing member may be chosen to provide for desired strength and/or flexibility of the sealing member. Furthermore, the material may be chosen to insulate against lightning, e.g. to enhance lightning protection of interior components of the structure, such as the wind turbine blade.

The sealing member may be reinforced, e.g. by including e-glass or aramid fibres in the sealing member. For example, one or more e-glass or aramid biaxial sheet(s) may be provided between layers of thermoplastic polyurethane to form the sealing member.

The sealing member may encircle the first outer shell of the first blade section and/or the second outer shell of the second blade section. For example, the sealing member may extend from a trailing edge of the wind turbine blade, along a suction side of the wind turbine blade, past a leading edge of the wind turbine blade, along a pressure side of the wind turbine blade, to the trailing edge of the wind turbine blade. One continuous piece of the sealing member may extend all the way around the outer shell(s) of the wind turbine blade. Thus, in a preferred embodiment, the sealing member is a single, continuous piece. It is particularly preferred that opposing ends of the single sealing member are joined, preferably at the trailing edge of the wind turbine blade, to provide a closed loop of the sealing member. In a preferred embodiment, the wind turbine blade comprises only one sealing member according to the present invention. It is particularly preferred that, the wind turbine blade comprises only one sealing member, the sealing member being composed of a unitary material throughout its extent. The unitary material may comprise polyurethane, such as thermoplastic polyurethane or fibre-reinforced thermoplastic polyurethane.

Applying the sealing member may comprise positioning the sealing member to encircle the first outer shell of the first blade section and/or the second outer shell of the second blade section. Applying the sealing member may comprise positioning the sealing member to extend from the trailing edge of the wind turbine blade, along the suction side of the wind turbine blade, past the leading edge of the wind turbine blade, along the pressure side of the wind turbine blade, to the trailing edge of the wind turbine blade. The sealing member may be applied in any suitable order, e.g. the sealing member may be applied to the suction side before being applied to the pressure side, or the sealing member may be applied to the pressure side before being applied to the suction side.

The sealing member may extend in the lengthwise direction from a first sealing member end to a second sealing member end. The lengthwise direction of the sealing member may be parallel to the first edge and/or parallel to the second edge. The first sealing member end may be attached to the second sealing member end. For example, the first sealing member end may be attached to the second sealing member end at the trailing edge of the wind turbine blade, e.g. applying the sealing member, e.g. to the joint, may comprise attaching the first sealing member end to the second sealing member end. For example, the sealing member may be applied to the joint of the wind turbine blade from the trailing edge, around the outer shell(s) and back to the trailing edge on the opposite side of the wind turbine blade, where the two ends of the sealing member, the first sealing member end and the second sealing member end may be attached to each other. Attaching the first sealing member end to the second sealing member end may comprise bonding together a first connecting area of the second surface at the first sealing member end and a second connecting area of the second surface at the second sealing member end.

The first sealing member end and the second sealing member end may be attached by attaching a first connecting area of the second surface at the first sealing member end to a second connecting area of the second surface at the second sealing member end. For example, the first sealing member end may be attached to the second sealing member end by bonding together, such as gluing or welding, such as heat welding, the first connecting area and the second connecting area.

The first sealing member end may be attached to the second sealing member end, e.g. at the trailing edge of the wind turbine blade, such that the first sealing member end and the second sealing member end protrudes from the wind turbine blade, e.g. from the trailing edge of the wind turbine blade. The first sealing member end and/or the second sealing member end may form a projecting sealing member part, e.g. projecting from the wind turbine blade, such as from the trailing edge of the wind turbine blade. The projecting sealing member part may be shaped to contribute to the aerodynamic performance of the wind turbine blade. For example, the projecting sealing member part may be tapered towards the first edge and/or the second edge of the sealing member. The projecting sealing member part may be rounded, curved, or triangular.

In a preferred embodiment, the sealing member has a substantially symmetrical cross section. It was found that such symmetrical cross section of the sealing member helps maintaining the aerodynamic performance of the wind turbine blade.

The wind turbine blade, such as the first blade section and/or the second blade section, such as the first outer shell and/or the second outer shell may be formed to allow attachment of the first sealing member end and the second sealing member end, with no or a limited projecting sealing member. For example, a gap between the first end and the second end may be increased near the trailing edge, e.g. to allow attachment of the first sealing member end and the second sealing member end through the gap. For example, the trailing edge of the first outer shell may comprise a first void section and/or the trailing edge of the second outer shell may comprise a second void section, e.g. such as to form the increased gap.

The sealing member may be positioned such that the lengthwise direction of the sealing member is in a plane substantially perpendicular to the longitudinal axis of the wind turbine blade. For example, applying the sealing member may comprise orientating the sealing member such that the lengthwise direction of the sealing member is in a plane substantially perpendicular to the longitudinal axis of the wind turbine blade. The sealing member may be positioned such that the lengthwise direction of the sealing member is orientated substantially parallel to a direction of expected airflow across the wind turbine blade when in operation, in particular expected airflow at the position of the sealing member. Such orientation of the sealing member provides that the valleys and/or ridges are parallel to the expected airflow, and thereby noise generated by the sealing member may be reduced.

The first end of the first blade section and the second end of the second blade section may be spaced apart to form a gap between the first end and the second end. For example, the gap may be formed between the first outer shell and the second outer shell. The sealing member may extend across the gap, e.g. when the sealing member is applied to the wind turbine blade, such as to the joint of the wind turbine blade. The corrugated section may be positioned in the gap, e.g. the corrugated section may be positioned between the first end and the second end.

The wind turbine blade may comprise a spar beam, such as a spar beam coupling the first blade section and the second blade section. The spar beam may longitudinally extend along a spar beam axis, e.g. from a first beam position, such as a first beam end, to a second beam position, such as a second beam end. The spar beam may be positioned such that the first beam position is located in the first airfoil region and the second beam position is located in the second airfoil region. A third beam position, e.g. between the first beam position and the second beam position, may be aligned with the first end of the first blade section and/or the second end of the second blade section.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
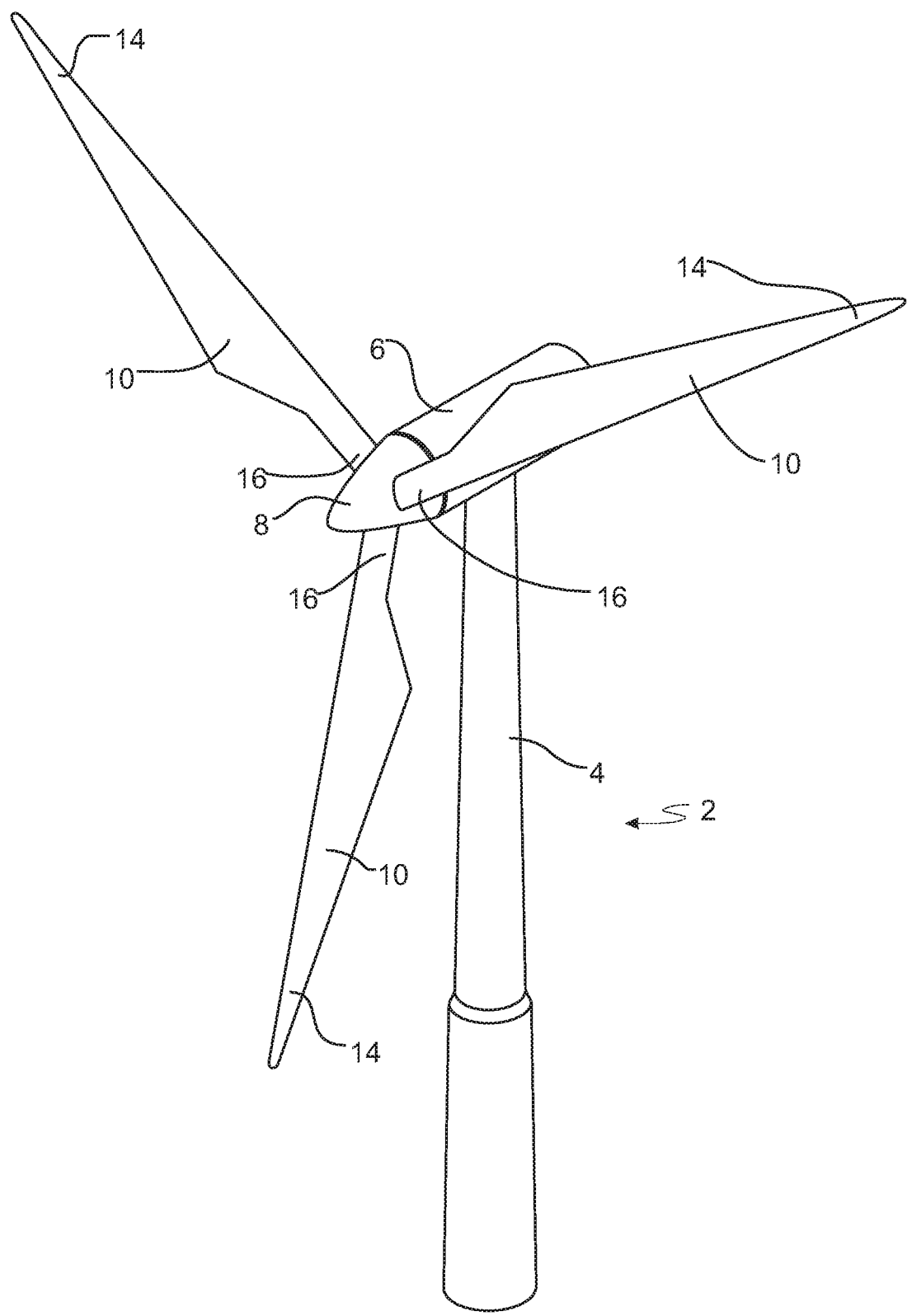
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2A:
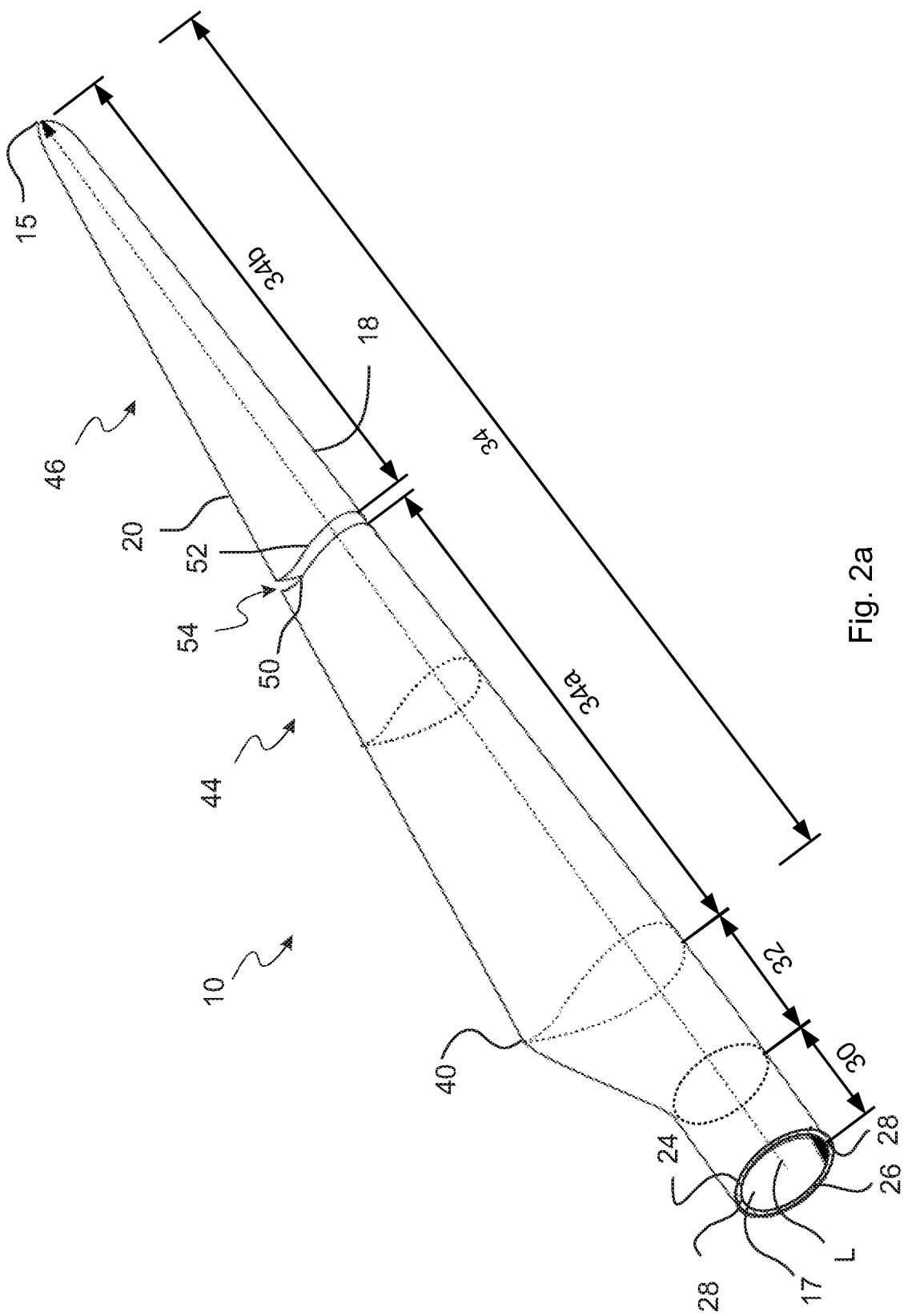
FIG. 2a is a schematic diagram illustrating an exemplary wind turbine blade.

FIG. 2a shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell which may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

The wind turbine blade 10 is a so-called split blade, or two-part blade, or segmented blade. The wind turbine blade 10 comprises a first blade section 44 and a second blade section 46. The first blade section 44 extends along the longitudinal axis L from a root, such as the root end 17, to a first end 50. The second blade section 46 extends along the longitudinal axis L from a second end 52 to a tip, such as the tip end 15. The first blade section 44 comprises a root region 30, a first airfoil region 34a and a transition region 32 between the root region 30 and the first airfoil region 34a. The second blade section 46 comprises a second airfoil region 34b with the tip, such as the tip end 15. The first blade section 44 and the second blade section 46 may be coupled with a spar beam (see FIG. 2b). The first blade section and the second blade section meet at a joint 54.

Figure 2B:
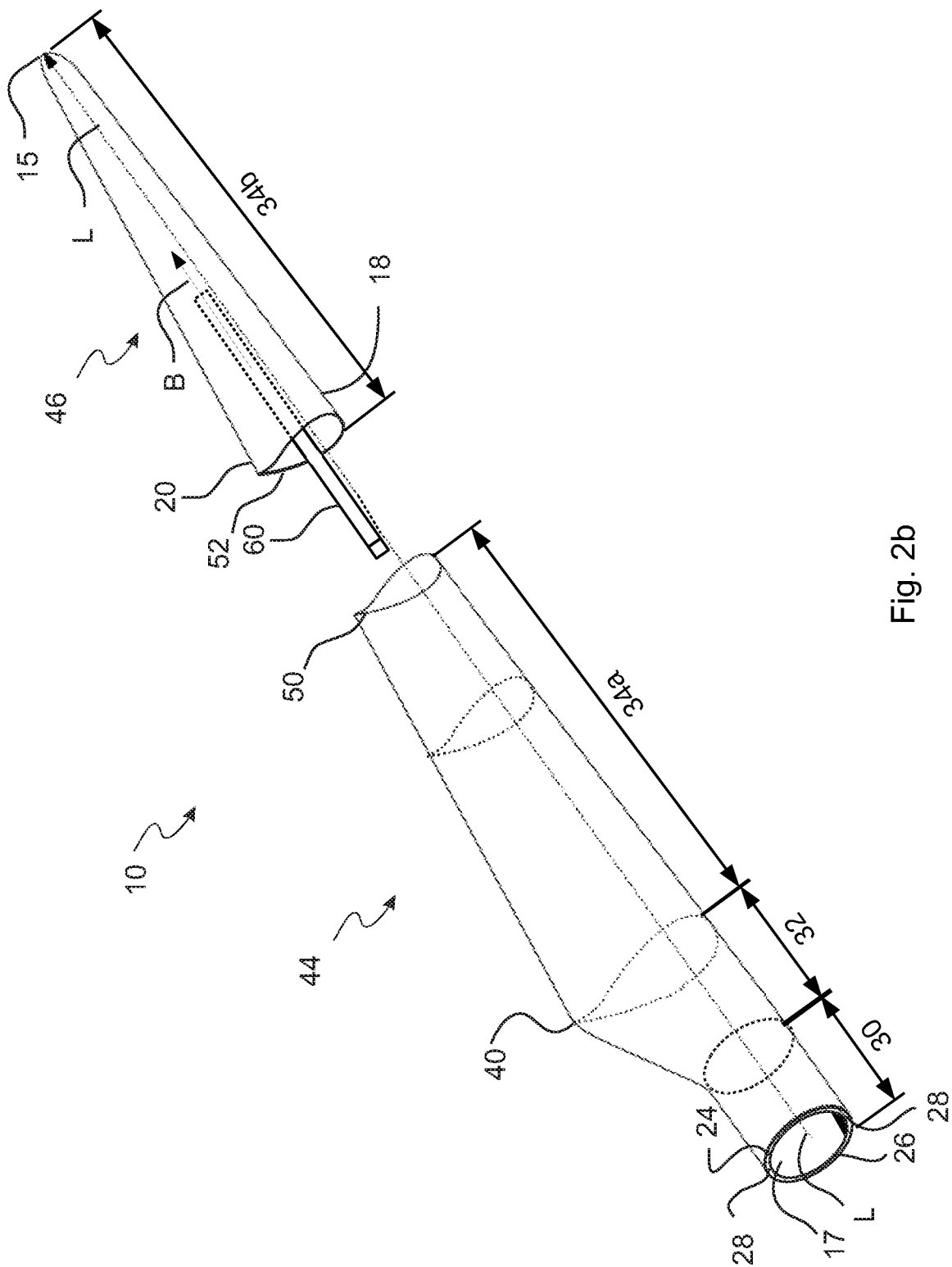
FIG. 2b is a schematic diagram illustrating an exemplary wind turbine blade.

FIG. 2b is a schematic diagram illustrating an exemplary wind turbine blade 10, such as the wind turbine blade 10 of the previous figures. The wind turbine blade 10 comprises a first blade section 44, a second blade section 46, and a spar beam 60 for coupling the first blade section 44 and the second blade section 46. The spar beam 60 may comprise carbon fibre, e.g. the spar beam 60 may comprise pultruded carbon fibre reinforced polymer.

The spar beam 60 extends, such as longitudinally extends, along a spar beam axis B, e.g. from a first beam position to a second beam position. The spar beam axis 6 may be coinciding and/or parallel with the longitudinal axis of the wind turbine blade 10. When the wind turbine blade is assembled, the spar beam 60 extends from a point in the first airfoil region 34a to point in the second airfoil region 34b. For example, the spar beam 60 may be positioned such that the first beam position, e.g. a first end of the spar beam, is located in the first airfoil region 34a, and the second beam position, e.g. a second end of the spar beam, is located in the second airfoil region 34b. A third beam position, between the first beam position and the second beam position, may be aligned with the first end 50 of the first blade section 44 and/or the third beam position may be aligned with the second end 52 of the second blade section 46.

Figure 3:
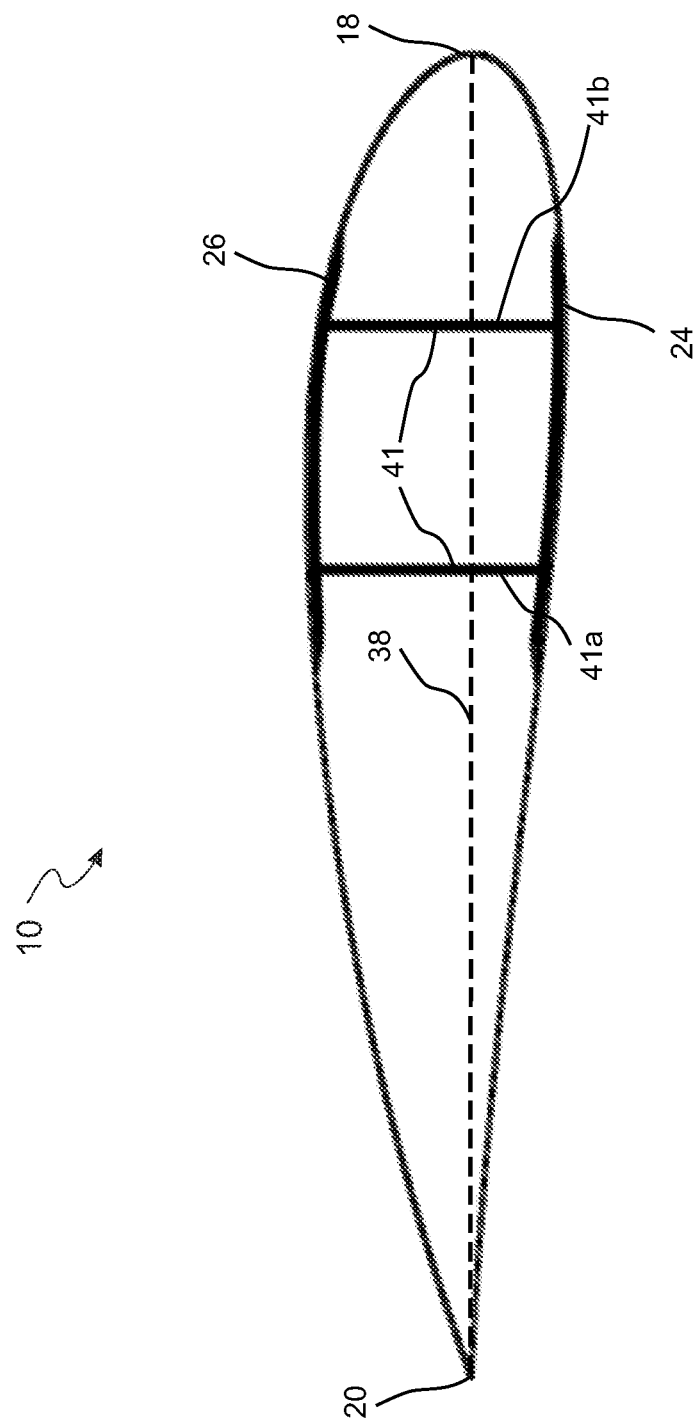
FIG. 3 is a schematic diagram illustrating a cross section of an exemplary wind turbine blade.

FIG. 3 is a schematic diagram illustrating a cross section of the airfoil region of an exemplary wind turbine blade 10, such as the wind turbine blade 10 of FIGS. 2a and 2b. The wind turbine blade 10 comprises a trailing edge 20, a leading edge 18, a pressure side 24, a suction side 26, shear webs 41, such as a trailing edge shear web 41a and a leading edge shear web 41b, and a chord line 38 running from the leading edge 18 to the trailing edge 20. The shear webs 41 could, in an alternative wind turbine blade, be replaced by sides of a spar. Thus, although in the following, examples may be provided with reference to a wind turbine blade comprising shear webs, these could be replaced by sides of a spar. For example, the wind turbine blade 10 may have shear webs as shown in a first blade section, while the wind turbine blade may be supported by a spar beam in a second blade section, for example, as illustrated in FIG. 2b.

Figure 4:
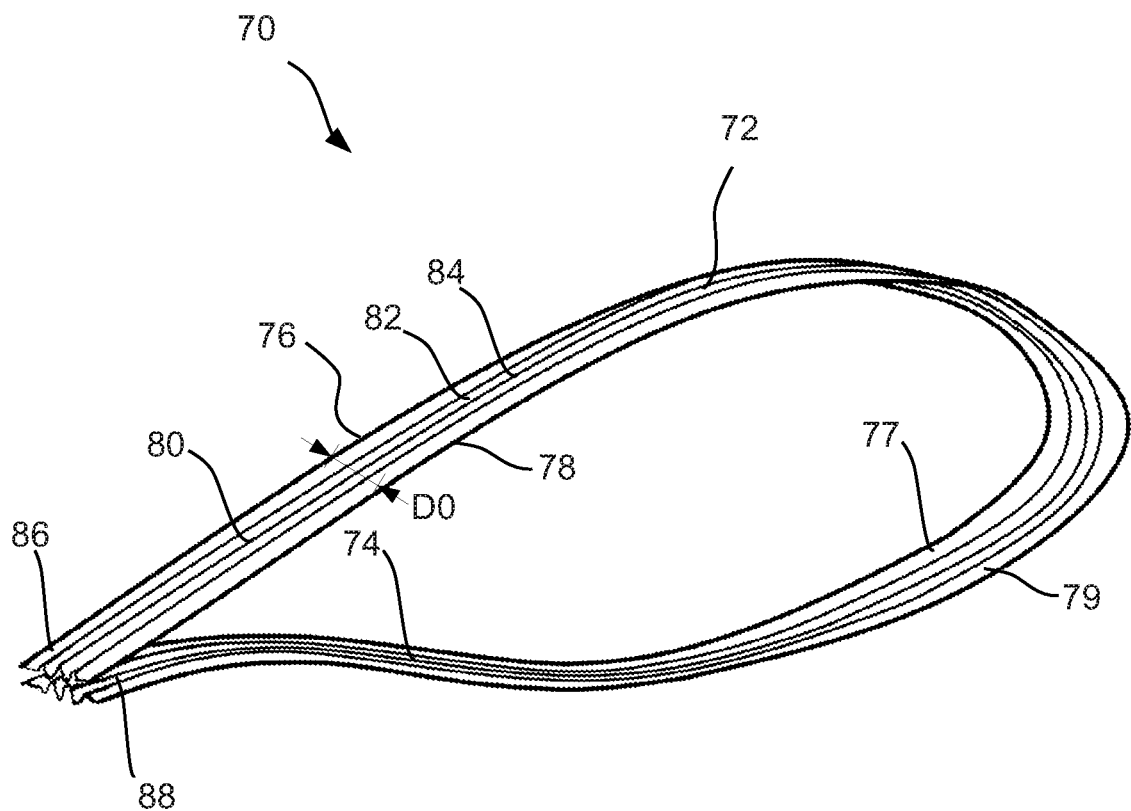
FIG. 4 is a schematic diagram illustrating an exemplary sealing member.

FIG. 4 is a schematic diagram illustrating an exemplary sealing member 70, such as a sealing member 70 for sealing a joint, such as a joint between a first blade section and a second blade section of a wind turbine blade, e.g. as illustrated in the previous figures, wherein the second blade section is coupled to the first blade section.

The sealing member 70 has a first surface 72 and a second surface 74. The sealing member 70 has a width D0 between a first edge 76 and a second edge 78. The sealing member is configured for attachment to a first outer shell of the first blade section along the first edge 76, and for attachment to a second outer shell of the second blade section along the second edge 78, The sealing member 70 comprises a corrugated section 80 between the first edge 76 and the second edge 78. The corrugated section comprises one or more valleys 82 and/or ridges 84 extending along a lengthwise direction of the sealing member 70.

The cross section of the sealing member 70 may be substantially constant along the lengthwise direction. The sealing member 70 extends in the lengthwise direction from a first sealing member end 86 to a second sealing member end 88. The first sealing member end 86 may be configured to be attached to the second sealing member end 88 such that the sealing member 70 may form a closed loop.

The second surface 74 comprises a first bond area 77 along the first edge 76. The first bond area 77 is configured to be bonded to the first outer shell. The second surface 74 comprises a second bond area 79 along the second edge 78. The second bond area 79 is configured to be bonded to the second outer shell.

Figure 5:
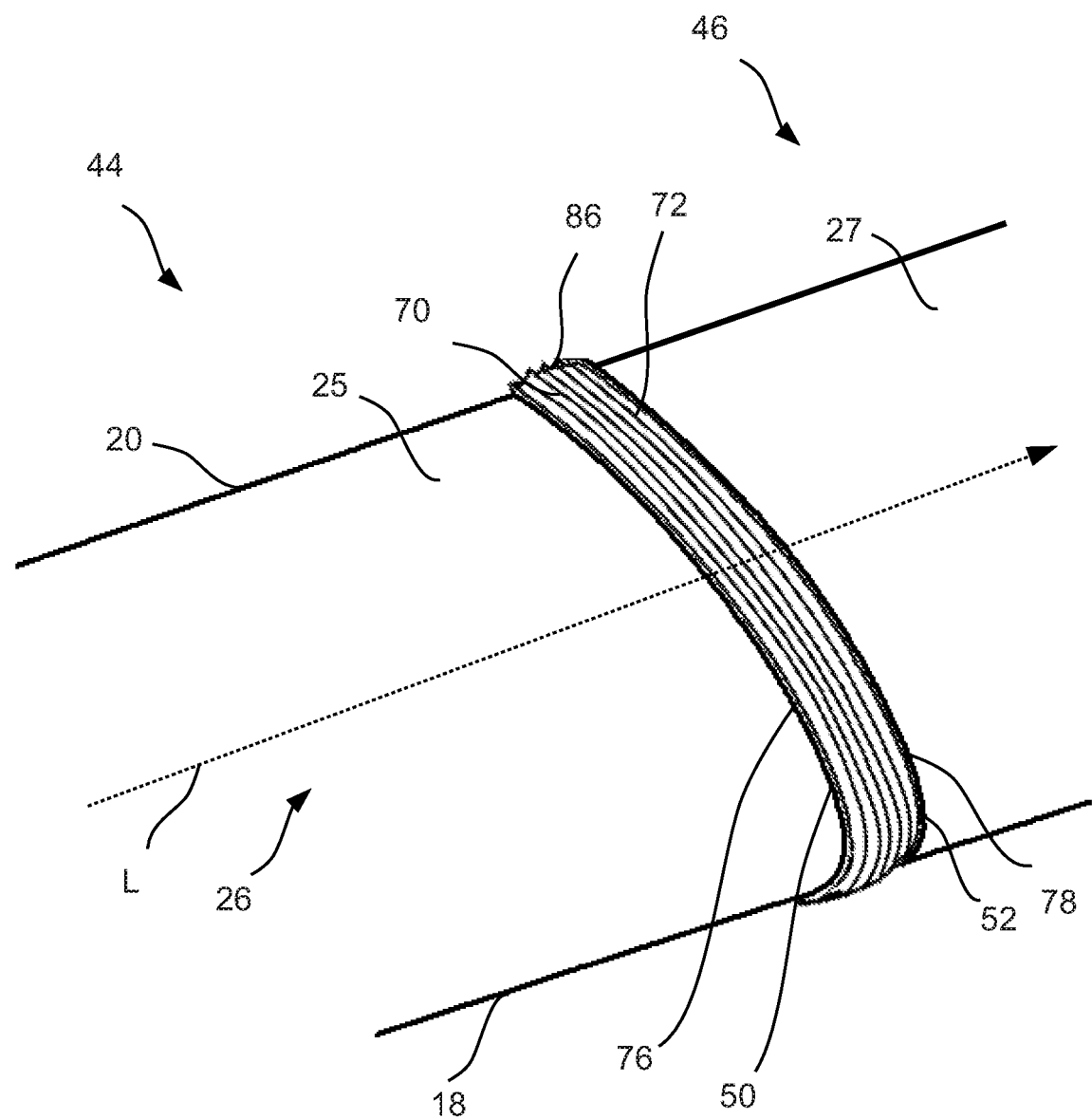
FIG. 5 is a schematic diagram illustrating an exemplary sealing member.

FIG. 5 is a schematic diagram illustrating an exemplary sealing member 70, such as the sealing member of the previous figures, being applied to a wind turbine blade, such as the wind turbine blade 10 as exemplified in relation to the previous figures. The sealing member 70 encircles the wind turbine blade, i.e. the sealing member 70 extends from the trailing edge 20, along the suction side 26, past the leading edge 18, along a pressure side (not shown), to the trailing edge 18. The sealing member 70 has a first end 86 and a second sealing member end (not shown), which meet and are attached to each other at the trailing edge 18 (see FIG. 7 for more details). The sealing member 70 has a first surface 72, a second surface (not shown) facing the wind turbine blade outer shells, a first edge 76 and a second edge 78. The sealing member is attached to the first outer shell 25 of the first blade section 44 along the first edge 76. The sealing member 70 is attached to the second outer shell 27 of the second blade section 46 along the second edge 78. The sealing member 70 is positioned such that the lengthwise direction of the sealing member is in a plane substantially perpendicular to the longitudinal axis L of the wind turbine blade 10.

Figure 6:
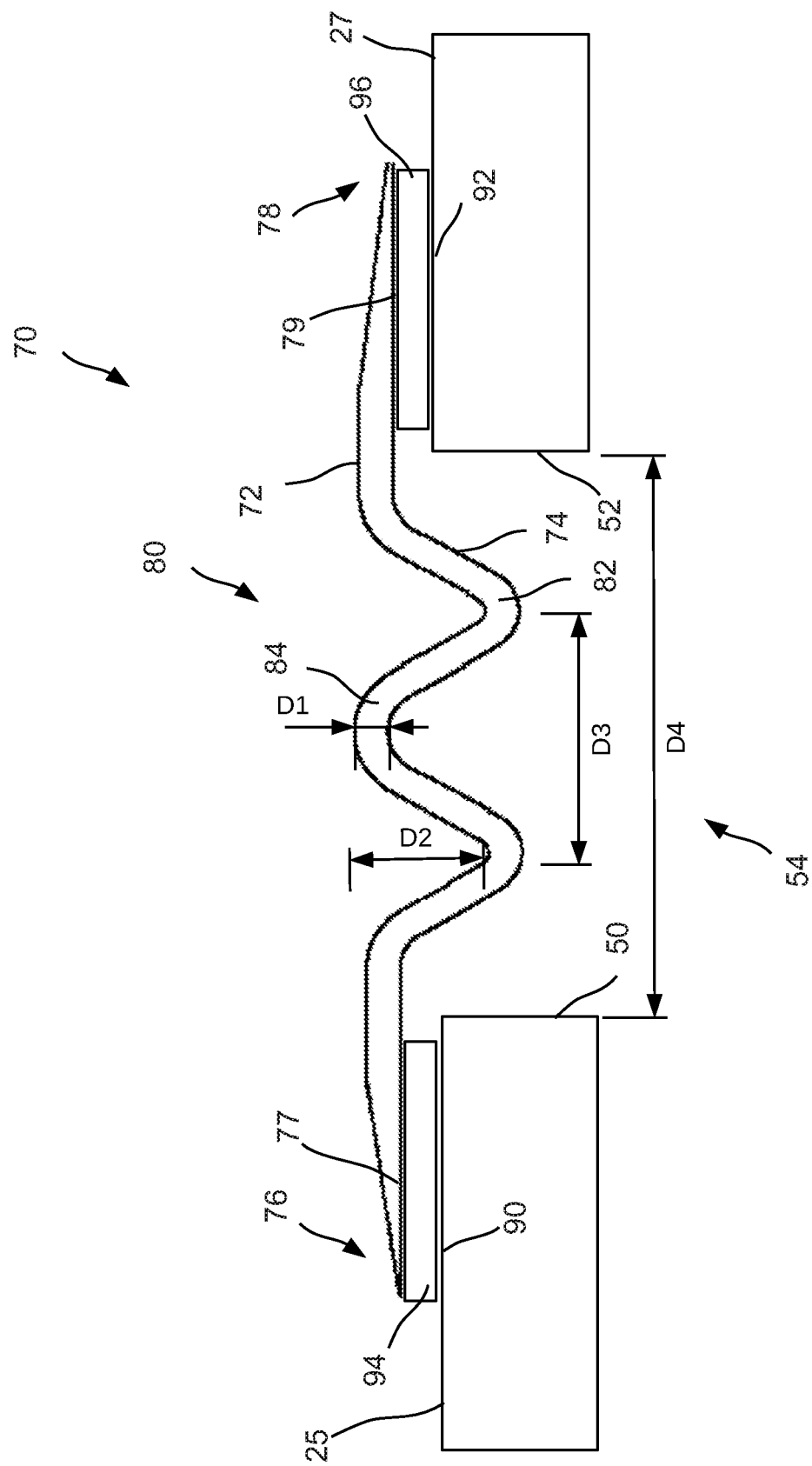
FIG. 6 is a schematic diagram illustrating a cross section of an exemplary sealing member.

FIG. 6 is a schematic diagram illustrating a cross section of an exemplary sealing member 70, such as the sealing member of the previous figures. The sealing member 70 has a first surface 72, a second surface 74, a first edge 76 and a second edge 78. The sealing member 70 is attached to the first outer shell 25 of the first blade section 44 along the first edge 76 and the sealing member 70 is attached to the second outer shell 27 of the second blade section 46 along the second edge 78. The second surface 74 comprises a first bond area 77 and a second bond area 79. The sealing member may be attached by bonding together the first bond area 77 of the sealing member and a first shell bond area of the first outer shell 90, and by bonding together the second bond area 79 of the sealing member and a second shell bond area of the second outer shell 92. Bonding may comprise using e.g. gluing, welding, tape, adhesive. The sealing member 70 extends across joint 54 between the first end 50 of the first outer shell 25 and the second end 52 of the second outer shell 27. In the illustrated example, the joint forms a gap, and the sealing member 70 extends across the gap between the first end 50 and the second end 52. The gap of the joint 54, e.g. the distance D4 between the first end 50 and the second end 52, may be between 20-80 mm, such as 40 mm.

Between the first edge 76 and the second edge 78 is a corrugated section 80 comprising one or more valleys 82 and/or ridges 84, which extend along a lengthwise direction of the sealing member 70, e.g. the valleys 82 and/or ridges 84 extend parallel to the first edge 76 and/or the second edge 78. The corrugated section 80 of the sealing member 70 is positioned in the gap of the joint 54.

The sealing member has a thickness D1 between the first surface 72 and the second surface 74. The thickness D1 may be uniform in the corrugated section and be between 0.5-5.0 mm, such as 2 mm.

The sealing member 70 has a peak-to-peak height D2, e.g. between the ridges 84 and valleys 82. The height D2 may be between 10-30 mm, such as 15 mm.

The sealing member 70 has a distance D3 between valleys and/or ridges, e.g. a valley to ridge distance, e.g. between two valleys and/or two ridges. The distance D3 between valleys and/or ridges may be between 5-30 mm, such as 20 mm.

Figure 7:
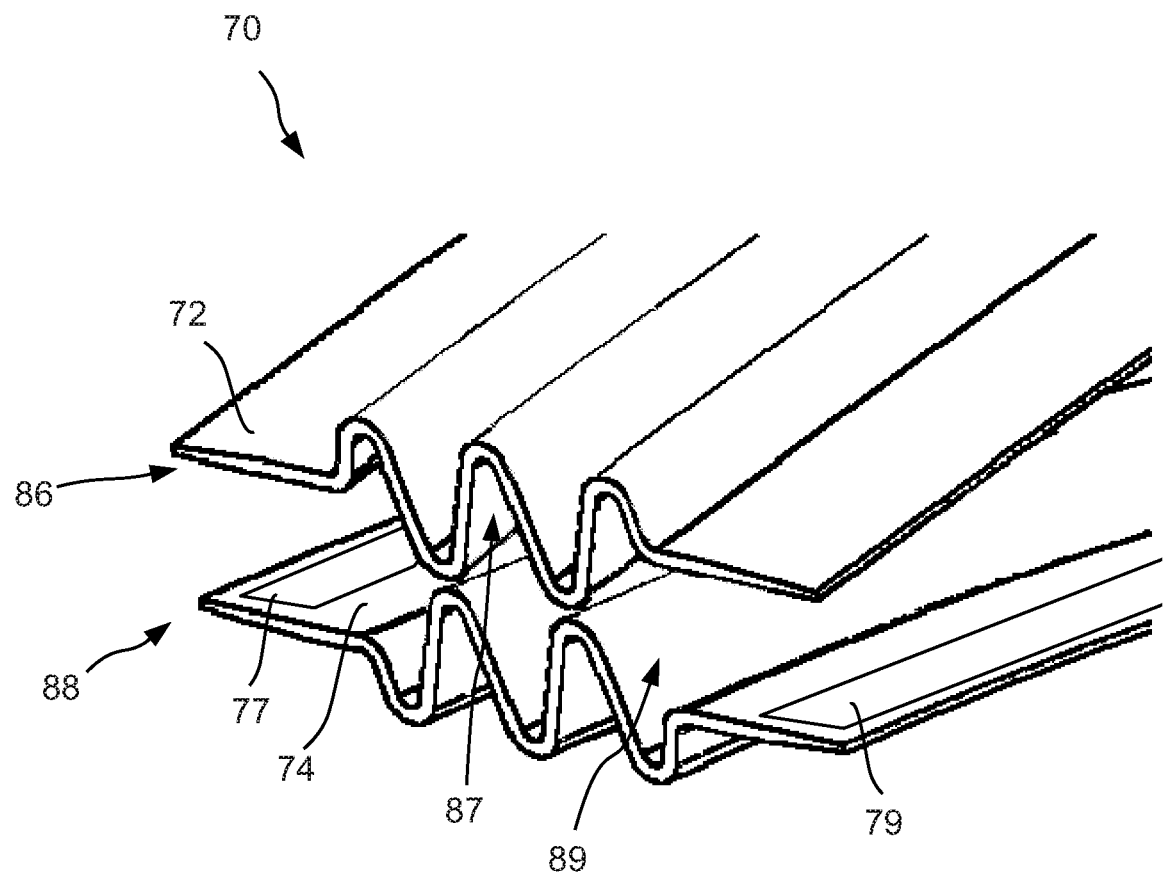
FIG. 7 is a schematic diagram illustrating an exemplary sealing member.

As seen in FIGS. 6 and 7, the sealing member 70 preferably has a substantially symmetrical cross section to help maintain the aerodynamic performance of the wind turbine blade.

FIG. 7 is a schematic diagram illustrating an exemplary sealing member 70, such as the sealing member of the previous figures. FIG. 7 shows the first end 86 and the second end 88 of the sealing member 70. The second surface 74 has a first bond area 77 for attaching to the first outer shell of the wind turbine blade and a second bond area 79 for attaching to the second outer shell of the wind turbine blade. The second surface 74 has a first connecting area 87 at the first end 86 of the sealing member and a second connecting area 89 at the second end 88 of the sealing member. The first end 86 and the second end 88 meet and attach to each other at the trailing edge of the wind turbine blade. The first end 86 and the second end 88 may be attached by bonding together the first connecting area 87 and the second connecting area 89, e.g. by welding, such as heat welding.

FIGS. 8a-d are schematic diagrams illustrating an exemplary sealing member 70, such as the sealing member of the previous figures being applied to a joint of a wind turbine blade 10 (only partly shown). FIGS. 8a-d shows the sealing member 70 having a projecting sealing member part 98. The first sealing member end 86 and/or the second sealing member end 88 may form the projecting sealing member part 98. The first sealing member end 86 and the second sealing member end 88 may be attached together at the projecting sealing member part 98. The projecting sealing member part 98 may be caused by the first sealing member end 86 and the second sealing member end 88 being attached together, e.g. to allow heat welding of the first sealing member end 86 together with the second sealing member end 88.

FIGS. 8a-d shows the sealing member 70 being applied to the first outer shell 25 of the first blade section 44 and the second outer shell 27 of the second blade section 46, such that the sealing member 70 is attached to the first outer shell 25 along a first edge 76 of the sealing member and the sealing member 70 is attached to the second outer shell 27 along a second edge 78 of the of the sealing member 70.

Figure 8:
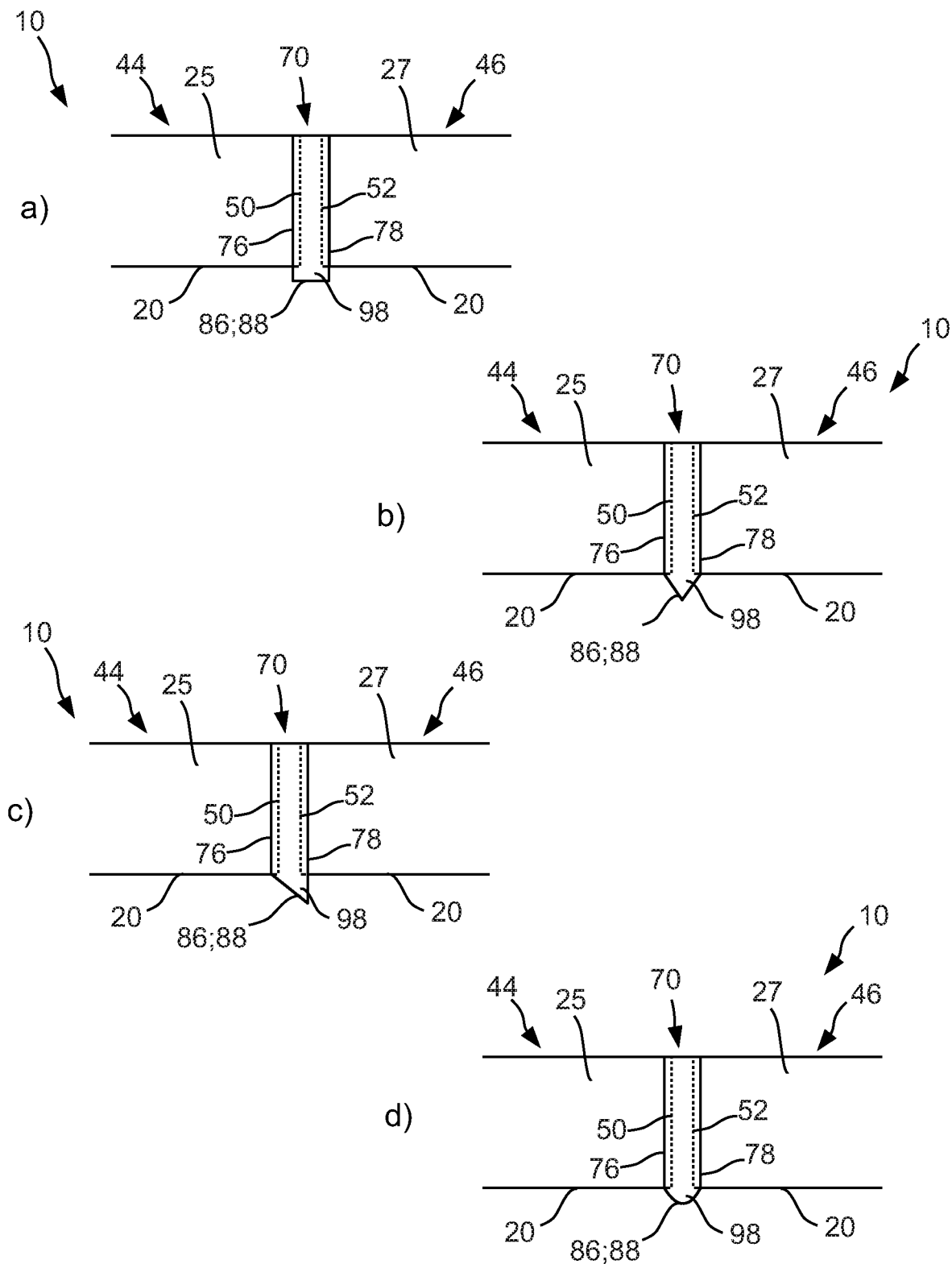
FIG. 8a-d are schematic diagrams illustrating an exemplary sealing member, FIG. 9 are schematic diagrams illustrating part of an exemplary wind turbine blade.

The projecting sealing member part 98 may project from the wind turbine blade 10, such as from the trailing edge 20 of the wind turbine blade as illustrated. Furthermore, the projecting sealing member part 98 may be shaped in various shapes, e.g. to contribute to the aerodynamic performance of the wind turbine blade 10. For example, the projecting sealing member part 98 may be tapered towards the first edge 76 as illustrated in FIGS. 8b-d. Alternatively or additionally, the projecting sealing member part 98 may be tapered towards the second edge 78 as illustrated in FIGS. 8c-d. The projecting sealing member part 98 may be rounded or curved, or triangular.

The projecting sealing member part 98 may be shaped, e.g. by cutting the first sealing member end 86 and/or the second sealing member end 88 to form the desired shape, e.g. prior to attaching the first sealing member end 86 and the second sealing member end 88 and/or after attaching the first sealing member end 86 and the second sealing member end 88.

Figure 9:
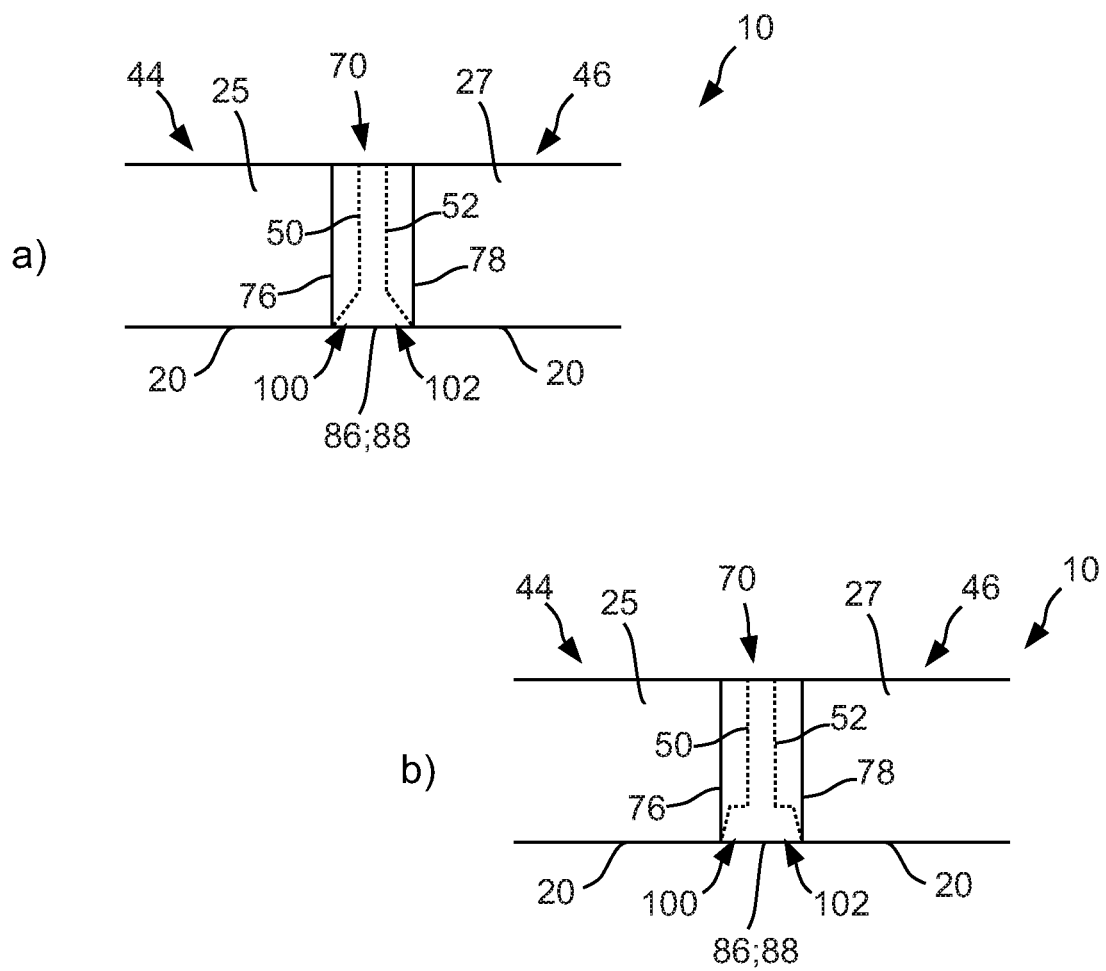

FIGS. 9a-b are schematic diagrams illustrating part of an exemplary wind turbine blade 10 having a first blade section 44 and a second blade section 46, and the joint between the first blade section 44 and the second blade section 46 being sealed by a sealing member 70, such as a sealing member 70 as described in relation to previous figures. FIGS. 9a-b shows examples of the first outer shell 25 of the first blade section 44 and the second outer shell 27 of the second blade section 46 comprising void sections 100, 102 at the trailing edge 20. The trailing edge 20 of the first outer shell 25 comprises a first void section 100. The trailing edge of the second outer shell 27 comprises a second void section 102. The first void section 100 and the second void section 100 form an increased gap near the trailing edge 20, to allow attachment of the first sealing member end 86 and the second sealing member 88 end through the gap. Thereby, a projecting sealing member end 98 as described in relation to FIGS. 8a-d, may be avoided or at least reduced.

The void sections 100, 102 may be provided in various shapes. The examples of FIGS. 9a-b, show two different shapes, e.g. triangular void section 100, 102 as illustrated in FIG. 9a, and trapezoid shaped void sections 100, 102 as illustrated in FIG. 9b.

Figure 10:
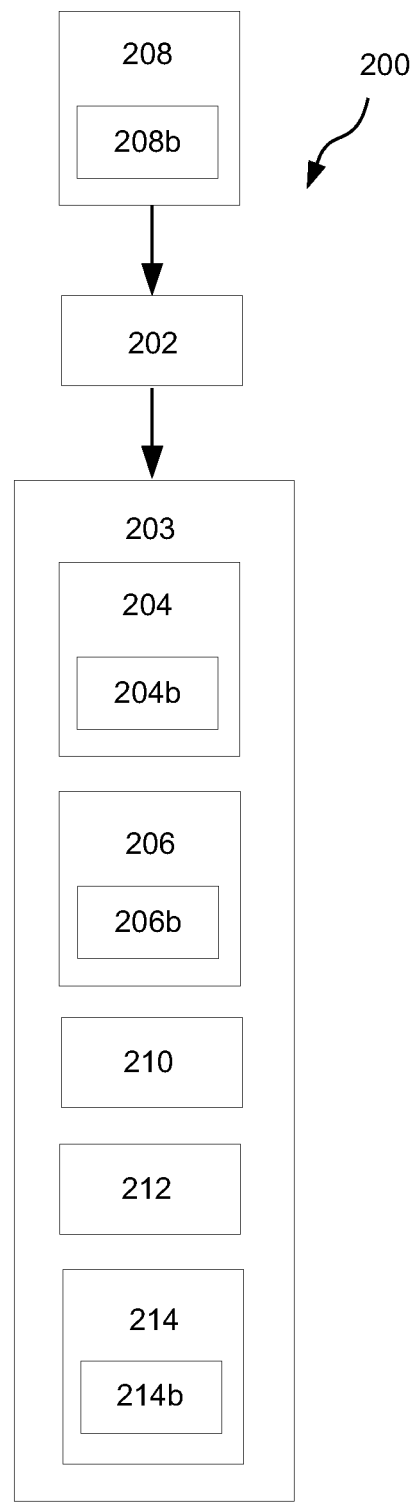
FIG. 10 is a flow diagram illustrating an exemplary method for sealing a joint.

FIG. 10 is a flow diagram illustrating an exemplary method 200 for sealing a joint with an exemplary sealing member, such as a sealing member as described in relation to one or more of the previous figures. The joint may be between a first blade section and a second blade section of a wind turbine blade, such as a wind turbine blade as described in relation to the previous figures, wherein the second blade section is coupled to the first blade section.

The method 200 comprises, e.g. after coupling and positioning the sections forming the joint, such as after coupling and positioning the first blade section and the second blade section in their respective position to form the wind turbine blade, providing 202 a sealing member having a first surface and a second surface, the sealing member having a width between a first edge and a second edge, the sealing member comprising a corrugated section between the first edge and the second edge, the corrugated section comprising one or more valleys and/or ridges extending along a lengthwise direction of the sealing member.

The method 200 comprises applying 203 the sealing member to the joint between the first blade section and the second blade section. Applying 203 the sealing member comprises attaching 204 the sealing member to the first outer shell along the first edge. Applying 203 the sealing member comprises attaching 206 the sealing member to the second outer shell along the second edge.

The second surface comprises a first bond area along the first edge, and the second surface comprises a second bond area along the second edge. Attaching 204 the sealing member to the first outer shell along the first edge may comprise bonding 204b together the first bond area and a first shell bond area of the first outer shell. Attaching 206 the sealing member to the second outer shell along the second edge may comprise bonding 206b together the second bond area and a second shell bond area of the second outer shell.

The method 200 optionally comprises cleaning 208 a first shell bond area of the first outer shell and/or a second shell bond area of the second outer shell. Cleaning 208 the first shell bond area and/or the second shell bond area may comprise e.g. abrasing and/or cleaning using solvent. The cleaning 208 may comprise wiping 208b the first shell bond area and/or the second shell bond area dry, e.g. using a dry cloth. Cleaning 208 the first shell bond area and the second shell bond area may be performed prior to applying 203 the sealing member to the joint.

The method 200 optionally comprises, e.g. as part of applying 203 the sealing member, positioning 210 the sealing member to extend from a trailing edge of the wind turbine blade, along a suction side of the wind turbine blade, past a leading edge of the wind turbine blade, along a pressure side of the wind turbine blade, to the trailing edge of the wind turbine blade.

The sealing member may extend in a lengthwise direction from a first sealing member end to a second sealing member end.

The method 200 optionally comprises, e.g. as part of applying 203 the sealing member, orientating 212 the sealing member such that the lengthwise direction of the sealing member is in a plane substantially perpendicular to the longitudinal axis of the wind turbine blade. For example, the sealing member may be positioned such that the lengthwise direction of the sealing member is substantially parallel to a direction of expected airflow across the wind turbine blade when in operation.

The method 200 optionally comprises, e.g. as part of applying 203 the sealing member, attaching 214 the first sealing member end to the second sealing member end, e.g. near the trailing edge of the wind turbine blade. For example, the first sealing member end and the second sealing member end may be attached 214 together, after having wound the sealing member around the outer shells of the wind turbine blade, and/or having attached 204, 206 the sealing member to the first outer shell and the second outer shell.

Attaching 214 the first sealing member end to the second sealing member optionally comprises bonding together 214b, e.g. by heat welding, a first connecting area of the second surface at the first sealing member end and a second connecting area of the second surface at the second sealing member end.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
25 first outer shell
26 second blade shell part (suction side)
27 second outer shell
28 bond lines/glue joints
30 root region
32 transition region
34 airfoil region
34a first airfoil region
34b second airfoil region
36 tip
38 chord line
40 shoulder
41 shear web
41a trailing edge shear web
41b leading edge shear web
44 first blade section
46 second blade section
50 first end
52 second end
54 joint
60 spar beam
70 sealing member
72 first surface of the sealing member
74 second surface of the sealing member
76 first edge of the sealing member
77 first bond area
78 second edge of the sealing member
79 second bond area
80 corrugated section of the sealing member
82 valley
84 ridge
86 first sealing member end
87 first connecting area
88 second sealing member end
89 second connecting area
90 first shell bond area of the first outer shell
92 second shell bond area of the second outer shell
94 first bonding material
96 second bonding material
98 projecting sealing member end
100 first void section
102 second void section
200 method
202 providing sealing member
203 applying sealing member
204 attaching sealing member to first outer shell
204b bonding together first bond area and first shell bond area
206 attaching sealing member to second outer shell
206b bonding together second bond area and second shell bond area
208 cleaning shell bond area(s)
208b wiping dry shell bond area(s)
210 positioning sealing member
212 orientating sealing member
214 attaching first sealing member end and second sealing member end
214b bonding together connecting area(s)
D0 width of sealing member
D1 thickness of sealing member
D2 peak-to-peak height of corrugated section
D3 distance between valleys and/or ridges
D4 distance between the first end and the second end (gap distance)

The invention claimed is:

1. A wind turbine blade comprising a first blade section and a second blade section coupled to the first blade section,
the first blade section extending along a longitudinal axis from a root to a first end, the first blade section comprising a root region and a first airfoil region, the first blade section comprising a first outer shell terminating at the first end,
the second blade section extending along the longitudinal axis from a second end to a tip, the second blade section comprising a second airfoil region, the second blade section comprising a second outer shell terminating at the second end,
the wind turbine blade comprising a sealing member having a first surface and a second surface, the sealing member having a width between a first edge and a second edge, the sealing member being attached to the first outer shell along the first edge, and the sealing member being attached to the second outer shell along the second edge,
the sealing member comprising a corrugated section between the first edge and the second edge, the corrugated section comprising one or more valleys and/or ridges extending along a lengthwise direction of the sealing member.

2. The wind turbine blade according to claim 1, wherein the sealing member extends from a trailing edge of the wind turbine blade, along a suction side of the wind turbine blade, past a leading edge of the wind turbine blade, along a pressure side of the wind turbine blade, to the trailing edge of the wind turbine blade.

3. The wind turbine blade according to claim 1, wherein the sealing member extends in the lengthwise direction from a first sealing member end to a second sealing member end, and wherein the first sealing member end is attached to the second sealing member end.

4. The wind turbine blade according to claim 3, wherein the first sealing member end and the second sealing member end is attached by attaching a first connecting area of the second surface at the first sealing member end to a second connecting area of the second surface at the second sealing member end.

5. The wind turbine blade according to claim 3, wherein the first sealing member end is attached to the second sealing member end at the trailing edge of the wind turbine blade.

6. The wind turbine blade according to claim 1, wherein the second surface comprises a first bond area along the first edge, and the second surface comprises a second bond area along the second edge, and wherein the sealing member is attached to the first outer shell by the first bond area and a first shell bond area of the first outer shell being bonded together, and wherein the sealing member is attached to the second outer shell by the second bond area and a second shell bond area of the second outer shell being bonded together.

7. The wind turbine blade according to claim 1, wherein the sealing member is positioned such that the lengthwise direction of the sealing member is in a plane substantially perpendicular to the longitudinal axis of the wind turbine blade.

8. The wind turbine blade according to claim 1, further comprising a spar beam coupling the first blade section and the second blade section, the spar beam longitudinally extending along a spar beam axis from a first beam position to a second beam position and being positioned such that the first beam position is located in the first airfoil region and the second beam position is located in the second airfoil region and a third beam position, between the first beam position and the second beam position, is aligned with the second end of the second blade section.

9. A sealing member for sealing a joint between a first blade section and a second blade section of a wind turbine blade, wherein the second blade section is coupled to the first blade section,
the sealing member having a first surface and a second surface, the sealing member having a width between a first edge and a second edge, the sealing member being configured for attachment to a first outer shell of the first blade section along the first edge, and for attachment to a second outer shell of the second blade section along the second edge,
the sealing member comprising a corrugated section between the first edge and the second edge, the corrugated section comprising one or more valleys and/or ridges extending along a lengthwise direction of the sealing member.

10. The sealing member according to claim 9, wherein the corrugated section has a peak-to-peak height between 10-30 mm.

11. The sealing member according to claim 10, wherein the peak-to-peak height of the corrugated section is 15 mm.

12. The sealing member according to claim 9 having a generally uniform thickness between the first surface and the second surface in the corrugated section between 0.5-5.0 mm.

13. The sealing member according to claim 12, wherein the thickness between the first surface and the second surface in the corrugated section is 2 mm.

14. The sealing member according to claim 9, wherein the sealing member is an extruded member, and wherein the sealing member has a substantially constant cross-section along the lengthwise direction.

15. The sealing member according to claim 9, wherein the sealing member is made of thermoplastic polyurethane.

16. The sealing member according to claim 15, wherein the thermoplastic polyurethane comprises aliphatic thermoplastic polyurethane.

17. A method for sealing a joint between a first blade section and a second blade section of a wind turbine blade, wherein the second blade section is coupled to the first blade section,
the first blade section extending along a longitudinal axis from a root to a first end, the first blade section comprising a root region and a first airfoil region, the first blade section comprising a first outer shell terminating at the first end,
the second blade section extending along the longitudinal axis from a second end to a tip, the second blade section comprising a second airfoil region, the second blade section comprising a second outer shell terminating at the second end,
after coupling and positioning the first blade section and the second blade section in their respective position to form the wind turbine blade, the method comprising:
providing a sealing member having a first surface and a second surface, the sealing member having a width between a first edge and a second edge, the sealing member comprising a corrugated section between the first edge and the second edge, the corrugated section comprising one or more valleys and/or ridges extending along a lengthwise direction of the sealing member;
applying the sealing member to the joint between the first blade section and the second blade section, applying the sealing member comprising:
attaching the sealing member to the first outer shell along the first edge; and
attaching the sealing member to the second outer shell along the second edge.

18. The method according to claim 17, further comprising cleaning a first shell bond area of the first outer shell and cleaning a second shell bond area of the second outer shell.

19. The method according to claim 17, wherein the sealing member in the lengthwise direction extends from a first sealing member end to a second sealing member end, and wherein applying the sealing member comprises attaching the first sealing member end to the second sealing member end, and wherein attaching the first sealing member end to the second sealing member end comprises bonding together a first connecting area of the second surface at the first sealing member end and a second connecting area of the second surface at the second sealing member end.

* * * * *